(No Model.)
G. E. SPARE.
JUMP SEAT CARRIAGE.
No. 435,717.          Patented Sept. 2, 1890.
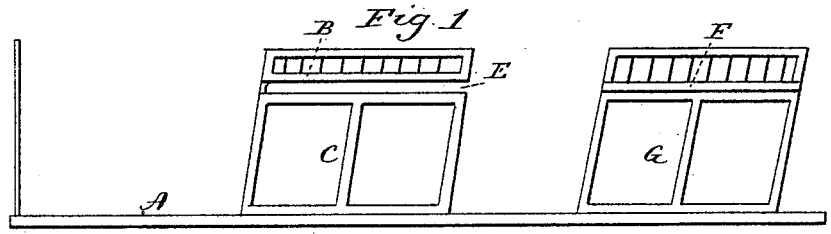
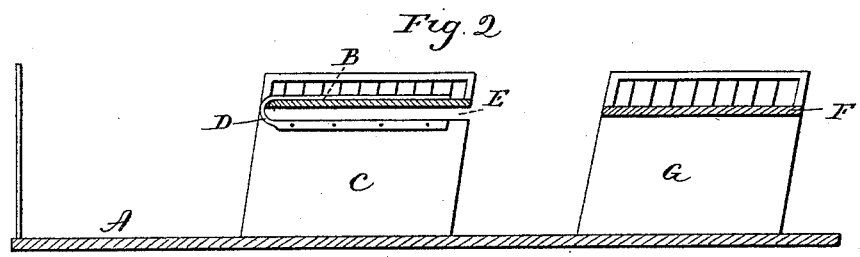
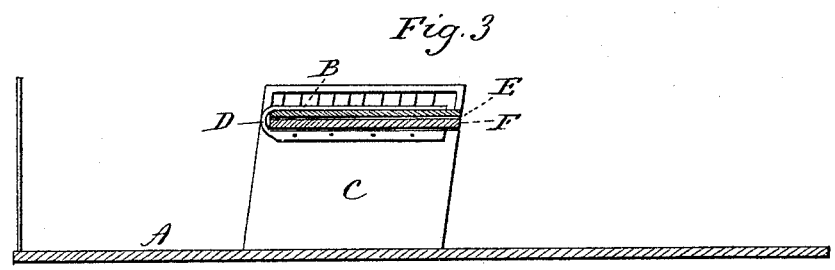
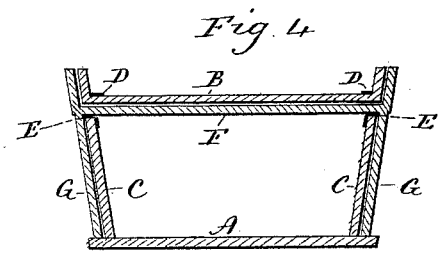 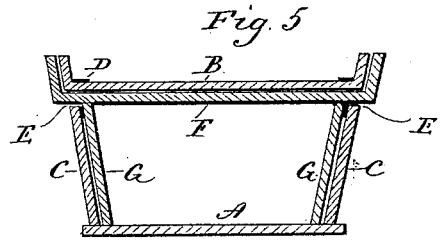
 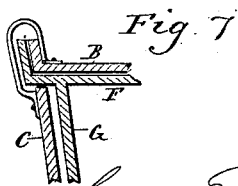
Witnesses
J. K. Shumway
Lillian D. Kelsey
George E. Spare, Inventor
By atty. Earle Seymour

UNITED STATES PATENT OFFICE.

GEORGE E. SPARE, OF NEW HAVEN, CONNECTICUT.

JUMP-SEAT CARRIAGE.

SPECIFICATION forming part of Letters Patent No. 435,717, dated September 2, 1890.

Application filed June 20, 1890. Serial No. 356,069. (No model.)

*To all whom it may concern:*

Be it known that I, GEORGE E. SPARE, of New Haven, in the county of New Haven and State of Connecticut, have invented a new Improvement in Jump-Seat Carriages; and I do hereby declare the following, when taken in connection with accompanying drawings and the letters of reference marked thereon, to be a full, clear, and exact description of the same, and which said drawings constitute part of this specification, and represent, in—

Figure 1, a side view of the carriage with the rear seat in the position of a two-seat carriage; Fig. 2, a longitudinal section of the same; Fig. 3, the same longitudinal section as in Fig. 2, showing the rear seat as moved into the forward or single-seat position; Fig. 4, a transverse section showing the uprights of the rear seat as outside the uprights of the forward seat; Fig. 5, the same section showing the uprights of the forward seat outside the uprights of the rear seat; Fig. 6, a perspective view of the bracket detached; Fig. 7, a modification.

This invention relates to an improvement in that class of carriages which are provided with two seats, and in which the forward seat is in a stationary position, while the rear seat is adapted to move forward into a position corresponding with the forward seat, so as to make the carriage substantially a one-seat carriage, or moved rearward into position as a second or rear seat, and such as commonly called "jump-seat carriages," in contradistinction to a carriage in which the two seats are in stationary positions, and particularly to that class in which the rear seat is adapted to slide on guides backward and forward from the single-seat to the double-seat position, or vice versa. In the more general construction of this class of carriages the front seat is required to be hinged so as to turn upward and forward for the bringing of the rear seat into a position as a single-seat carriage.

The object of my invention is to make the front seat positively stationary, and at the same time make the rear seat readily movable into or from the single-seat position, and give to the rear seat a length somewhat greater than that of the front seat, whereby the contracting of the rear seat, as in many of this class of carriages, is avoided; and the invention consists in supporting the front seat upon uprights so that the support comes at the front edge of the seat, leaving longitudinal slots in the uprights beneath the seat open at the rear, the plane of the rear seat corresponding to the said slots, so that the rear seat in being moved forward will pass into said slots from the rear and into a position beneath the forward seat, the rear seat being of a length greater than that of the front seat, so that the arms of the rear seat pass outside the arms of the forward seat, as more fully hereinafter described.

In illustrating the invention I show it as applied to a buckboard-wagon, and to which it is more particularly adapted, although it may be employed in other classes of carriages.

A represents the body; B, the front seat; C, the uprights which support the front seat. These uprights are arranged at or near each side of the wagon, so as to stand beneath the front seat at the ends; but instead of resting directly upon the uprights, a U-shaped bracket D of suitable metal—as iron or steel— is formed, as seen in Fig. 6. The legs of this bracket are distant from each other somewhat greater than the thickness of the rear seat. The bracket is arranged as seen in Fig. 2, one leg extending longitudinally on the upright, the closed end at the front. The other leg extends onto the seat B, the one leg of the bracket being secured to the upright and the other to the seat, as seen in Fig. 2. The upright extends no higher than the upper edge of the bracket, which is secured thereto, so as to leave a slot E between the seat proper and the upright. A like bracket is applied to each upright, so as to make connection between the uprights at both ends of the seat, yet leave the slot E between the uprights and the seats, the slot being open at the rear. The bracket D is of a strength sufficient to support the seat without the interposition of any further support at the rear. The bracket may be introduced upon the inside of the upright and extend onto the seat, so as to be unexposed.

F represents the rear seat, which is supported upon uprights G in the usual manner for this class of wagons. The plane of the seat F is in the plane of the slot E, as seen in Fig. 1. The rear seat F is of so much greater length than the front seat B that the arms of the rear seat are in a plane outside of the ends or arms of the forward seat, so that when the rear seat is moved forward it will pass into the slots E beneath the seat B, as seen in Figs. 3 and 4, the ends or arms of the rear seat passing outside the ends or arms of the front seat, it being understood that the rear seat is guided on the body in the usual manner. The uprights G of the rear seat may be in a plane outside the uprights C of the forward seat, so that as the rear seat moves forward the uprights G will pass outside the uprights C on the front seat, as seen in Fig. 4; or the uprights G may be in a plane inside the plane of the uprights C, so as to pass inside those uprights C when the seat is moved forward, as represented in Fig. 5.

While I prefer to make the forward support of the seat by means of longitudinally-arranged U-shaped brackets, the bracket may be of the form seen in Fig. 7, the upright C of the front seat being outside and the upright G of the rear seat being in a plane inside of the upright C. In this case the bracket is of inverted-U shape, one leg of the U attached to the seat extending up over the end of the seat, thence down distant from that arm, so as to permit the arm of the rear seat to pass in between the legs of the U, the second leg extending down and secured to the upright of the front seat below the slot. This modification is made the subject of an independent application.

While preferring the longitudinal arrangement of the bracket, I do not wish to be understood as limiting the invention to this particular form of bracket, the essential feature of the invention being the support of the seat from the upright below so as to leave a slot below the seat at each end open at the rear, into which the rear seat may pass.

I claim—

1. In a jump-seat carriage, the forward seat arranged upon uprights, so as to leave a longitudinal slot E at each end of and beneath the seat, the said slots open at the rear, combined with a bracket one leg of which is secured to the seat above the slot and spanning said slot, the other leg secured to the upright below, combined with a rear seat arranged on the body to slide longitudinally, the said rear seat being in the plane of said slots, so that the rear seat may pass into said slots below the forward seat to produce a single-seat carriage, substantially as described.

2. In a jump-seat carriage, the combination of the stationary front seat B, having uprights at each end below it, with slots between said seat and uprights, the said slots open at the rear, U-shaped brackets D, longitudinally arranged, the closed end of the U at the forward edge of the seat, one leg secured to the upright below said slot and the other leg to the seat above said slot, and whereby said slot stands between the said two legs of the bracket, combined with a rear seat F, the plane of which is in the plane of said slot E, the said rear seat adapted to slide backward and forward and in its forward movement to pass into said slot E below the forward seat and between the legs of the said bracket, substantially as described.

GEO. E. SPARE.

Witnesses:
JOHN E. EARLE,
FRED C. EARLE.